United States Patent [19]

Utter et al.

[11] Patent Number: 5,537,462
[45] Date of Patent: Jul. 16, 1996

[54] SUPERVISORY INTERFACE CONTROLLER AND METHOD FOR REMOTELY CONTROLLED TERMINAL

[75] Inventors: Kevin R. Utter, Charlotte; Robert E. Lee, Pineville, both of N.C.

[73] Assignee: Aegis Technologies, Inc., Charlotte, N.C.

[21] Appl. No.: 228,571

[22] Filed: Apr. 15, 1994

[51] Int. Cl.⁶ .................................................. H04M 11/00
[52] U.S. Cl. ............................ 379/102; 348/14; 348/110
[58] Field of Search ................................ 379/102, 104, 379/105, 93, 97, 98, 354–357, 90, 110, 91; 348/14–20; 395/750; 375/222, 231

[56] References Cited

U.S. PATENT DOCUMENTS

| | | |
|---|---|---|
| 4,051,326 | 9/1977 | Badagnani et al. |
| 4,206,444 | 6/1980 | Ferlan . |
| 4,312,035 | 1/1982 | Greene . |
| 4,402,073 | 8/1983 | Hammond . |
| 4,593,349 | 6/1986 | Chase et al. |
| 4,677,566 | 6/1987 | Whittaker et al. |
| 4,701,946 | 10/1987 | Oliva et al. |
| 4,723,269 | 2/1988 | Summerlin . |
| 4,809,271 | 2/1989 | Kondo et al. |
| 4,813,040 | 3/1989 | Futato . |
| 4,816,905 | 3/1989 | Tweedy et al. |
| 4,887,158 | 12/1989 | Guichard et al. |
| 4,999,831 | 3/1991 | Grace . |
| 5,051,720 | 9/1991 | Kittirutsunetorn . |
| 5,150,211 | 9/1992 | Charbonnel et al. |
| 5,198,806 | 3/1993 | Lord . |
| 5,231,571 | 7/1993 | D'Agostino . |
| 5,253,167 | 10/1993 | Yoshida et al. |
| 5,274,797 | 12/1993 | Barlow et al. |
| 5,276,866 | 1/1994 | Paolini . |
| 5,347,646 | 9/1994 | Hirosawa et al. ............ 379/102 |
| 5,351,076 | 9/1994 | Hata et al. .................... 348/14 |
| 5,414,457 | 5/1995 | Kdaowaki et al. ........... 348/14 |

FOREIGN PATENT DOCUMENTS

| | | |
|---|---|---|
| 0120476A3 | 3/1984 | European Pat. Off. . |
| 0251593A2 | 6/1987 | European Pat. Off. . |
| WO93/10615 | 5/1993 | WIPO . |

OTHER PUBLICATIONS

*VC7000 Installation Guide*, undated.
*Operations Manual MCM/LPM–SBC53SX*, WinSystems, Inc., 1993.
*Operations Manual Motherboards Cardcages*, WinSystems, Inc., 1992.
International Search Report, PCT/US95/04218, Sep. 9, 1995.

Primary Examiner—Wing F. Chan
Attorney, Agent, or Firm—Bell, Seltzer, Park & Gibson

[57] ABSTRACT

A terminal which is remotely controlled over a digital data line includes a computer and a videotelephone for sending and receiving audio, video and digital data over the digital data line. The terminal also includes a remotely controlled power strip which has power outlets and relays for remotely controlling AC power to and from the power outlets. The computer is connected to at least one of the power outlets. The terminal also includes a plurality of switches, each of which corresponds to a telephone number. The terminal also includes a supervisory interface controller which is responsive to selection of one of the switches to identify a telephone number corresponding to the selected switch and to direct the videotelephone to place a telephone call to the identified telephone number, via the digital data line. The supervisory interface controller is also responsive to audio signals which are received over the digital data line for identifying DTMF (touch) tones which are received over the digital data line, to energize the relay in the power strip in response to identification of a predetermined DTMF tone sequence, to thereby apply power to the computer.

22 Claims, 5 Drawing Sheets

SUPERVISORY INTERFACE CONTROLLER AND METHOD FOR REMOTELY CONTROLLED TERMINAL

FIELD OF THE INVENTION

This invention relates to computer terminals, and more particularly to remotely controlled terminals.

BACKGROUND OF THE INVENTION

Remotely controlled terminals are widely used in networks of automatic teller machines, point of sale systems, computerized gasoline pumps and other networked applications. A unique method for providing personal financial services using remotely controlled terminals is described in U.S. Pat. No. 5,231,571 to D'Agostino issued Jul. 27, 1993, entitled *Personal Financial Assistant Computer Method*, and assigned to the assignee of the present invention, the disclosure of which is hereby incorporated herein by reference.

In D'Agostino, a network of host terminals, referred to as "representative terminals", and remotely controlled terminals, referred to as "customer terminals", are used to provide personal financial services. A telephone request is accepted at a representative terminal from a customer at a customer terminal. The representative terminal is linked to the customer terminal for data communication therebetween. The representative terminal then seizes control of the customer terminal so that the representative terminal remotely controls operation of the customer terminal. Personal financial services are then provided to a customer at the customer terminal under control of the representative terminal using personal financial services information which is stored at the customer terminal.

Remotely controlled terminals are typically unattended. That is, a human operator is typically not present to supervise operation of the remote terminal. The user (customer) is typically incapable of supervising operation of the remote terminal because the user is not familiar with the internal operations thereof. Accordingly, there is a need for a supervisory controller and method for a remotely controlled terminal.

A supervisory controller is often needed for remote control of power to the terminal. In particular, it is often necessary to switch power to and from the components of the remote terminal. Power may be applied when the terminal is brought online, and may be removed when the terminal is brought offline. Moreover, often a malfunction in a computer, printer or other component of a terminal may be corrected by removing and reapplying power to the malfunctioning device. This operation is often referred to as "rebooting" the device. The art has developed systems for remotely controlling power in a terminal but these systems tend to be complex and cumbersome. See U.S. Pat. No. 4,051,326 to Badagnani et al.; U.S. Pat. No. 4,206,444 to Ferlan; U.S. Pat. No. 4,312,035 to Greene; U.S. Pat. No. 4,593,349 to Chase et al.; U.S. Pat. No. 4,677,566 to Whittaker et al.; U.S. Pat. No. 4,701,946 to Oliva et al.; U.S. Pat. No. 4,723,269 to Summerlin; U.S. Pat. No. 5,051,720 to Kittirutsunetom; U.S. Pat. No. 5,198,806 to Lord; U.S. Pat. No. 5,253,167 to Yoshida et al.; and U.S. Pat. No. 5,274,797 to Barlow et al.

A supervisory controller and method are also often needed to dial telephone numbers. For example, the above cited D'Agostino patent includes a multiple number autodialer telephone which can be used to dial appropriate numbers for various financial services. Such a multiple number autodialer telephone uses a separate telephone line for a voice (audio) connection. The voice telephone line is used in addition to the digital data line which is used to transmit digital data and/or video between the host and remote computers. This duplication may require leasing of two separate telephone lines for each terminal. It is known to multiplex audio, video and digital data on a single line. However, such multiplexing can be complex and cumbersome. See U.S. Pat. No. 4,402,073 to Hammond; U.S. Pat. No. 4,809,271 to Kondo et al.; U.S. Pat. No. 4,813,040 to Futato; U.S. Pat. No. 4,816,905 to Tweedy et al.; U.S. Pat. No. 4,887,158 to Guichard et al.; U.S. Pat. No. 4,999,831 to Grace; U.S. Pat. No. 5,150,211 to Charbonnel et al.; and U.S. Pat. No. 5,276,866 to Paolini.

SUMMARY OF THE INVENTION

It is therefore an object of the present invention to provide an improved remotely controlled computer terminal and method.

It is another object of the present invention to provide remote control of power in a remotely controlled terminal.

It is yet another object of the present invention to provide a remotely controlled computer terminal and method which eliminates the need for a separate telephone line for voice signals.

These and other objects are provided according to the present invention by a terminal which is remotely controlled over a communications line such as a digital data line, and which includes a computer and a communications device such as a videotelephone for sending and receiving audio, video and digital data over the digital data line. The terminal also includes a remotely controlled power strip which has power outlets and relays or other means for remotely switching AC power to and from the power outlets. The computer is connected to at least one of the power outlets. The remotely controlled terminal also includes a telephone handset, and a plurality of switches each of which corresponds to a telephone number.

The terminal also includes a supervisory interface controller which is electrically connected to the videotelephone, the computer, the power strip, the telephone handset and the plurality of switches. The supervisory interface controller is responsive to selection of one of the switches, to identify a telephone number corresponding to the selected switch and to direct the videotelephone to place the telephone call to the identified telephone number on the digital data line. The supervisory interface controller is also responsive to audio which is received over the digital data line for identifying DTMF (touch) tones and for energizing the relay or other remote switching means in the power strip in response to identification of a predetermined DTMF tone sequence, to thereby apply power to the computer.

Accordingly, application and removal of power to and from components of the remotely controlled terminal are controlled, in response to DTMF tone sequences. The supervisory interface controller also allows multiple number autodialing to be performed through the videotelephone, without requiring a separate telephone line. High performance and simplified operation of the remotely controlled terminal is thereby provided.

The power strip may include multiple relays for switching multiple power outlets. The supervisory interface controller may be responsive to a first sequence of DTMF tones to energize at least a first outlet and to a second sequence of DTMF tones to energize at least a second outlet. Thus, individual components in the terminal may be rebooted. One switched outlet may be connected to the lights for the terminal so that the lights can be switched on and off independent of the switching of the other components. The supervisory interface controller is also preferably responsive to activation of a hook switch, which indicates removal of the handset from its cradle so that the telephone number corresponding to a selected switch is only dialed if the hook switch is activated.

Accordingly, a method for remotely controlling a terminal includes the steps of detecting selection of one of the switches and identifying a telephone number corresponding to the selected switch. The videotelephone is directed to place a telephone call on the digital data line to the identified telephone number. After placement of the telephone call, the host computer can seize control of the computer via the digital data line and data can be displayed in response to receipt of commands from the host computer.

Audio is received over the digital data line and DTMF tones are detected in the audio which is received over the digital data line. A predetermined DTMF tone sequence is identified. The remote switching means is energized in response to identification of the predetermined DTMF tone sequence, to thereby apply power to the computer.

Alternatively, first and second predetermined DTMF tone sequences may be identified and the first and second remote AC switching means, respectively, may be energized in response thereto.

It will be understood by those having skill in the art that a supervisory interface controller according to the present invention may include only the telephone dialing aspect or only the power switching aspect described above. However, preferably, both telephone dialing and power switching are included to provide a supervisory interface controller for remotely controlled terminals.

DETAILED DESCRIPTION OF PREFERRED EMBODIMENTS

Figure 1:
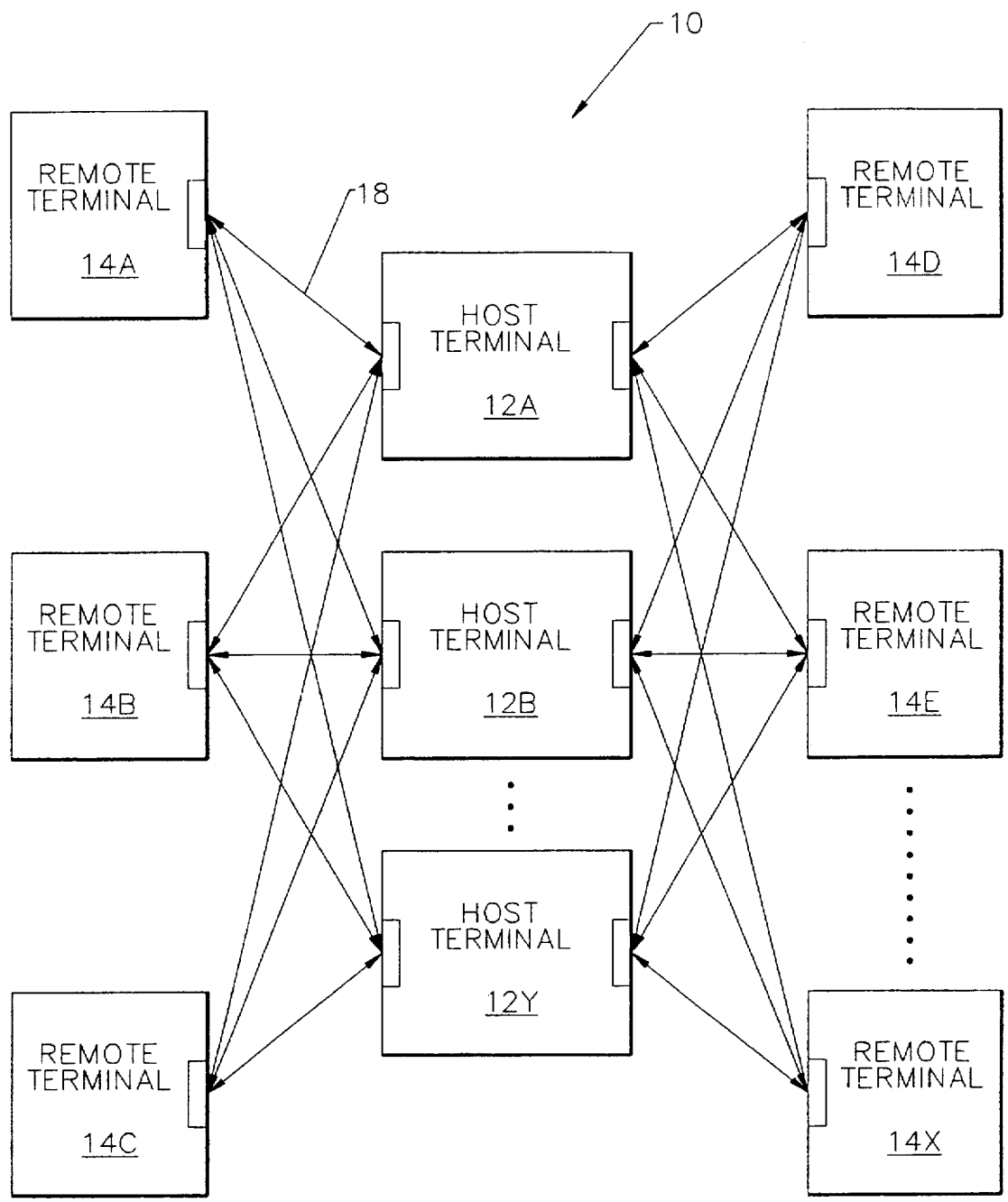
FIG. 1 is a block diagram of a network of host terminals and remote terminals, according to the present invention.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, the thickness of layers and regions are exaggerated for clarity. Like numbers refer to like elements throughout.

Referring now to FIG. 1, a block diagram of a network 10 of remotely controlled terminals 14 and host terminals 12 is illustrated. When providing personal financial services according to U.S. Pat. No. 5,231,571 to D'Agostino, host terminals 12A–12Y are referred to as "representative terminals" and remotely controlled terminals 14A–14X are referred to as "customer terminals". For simplicity, remotely controlled terminals 14A–14X will be referred to herein as remote terminals 14A–14X.

Still referring to FIG. 1, a communications line such as a digital data line 18 is provided between each remote terminal 14 and host terminal 12. The digital data line 18 may be used to send and receive voice (audio), video and digital data thereover. Digital data line 18 may be implemented by an ISDN digital telephone line, a T1 telephone line, or any other well known digital data line. An analog communications line may also be used to send and receive audio, video and digital data. According to the present invention, the functions of an analog audio telephone line are provided by digital data line 18 so that a separate analog telephone line connection between remote terminals 14 and host terminals 12 is not required.

Figure 2:
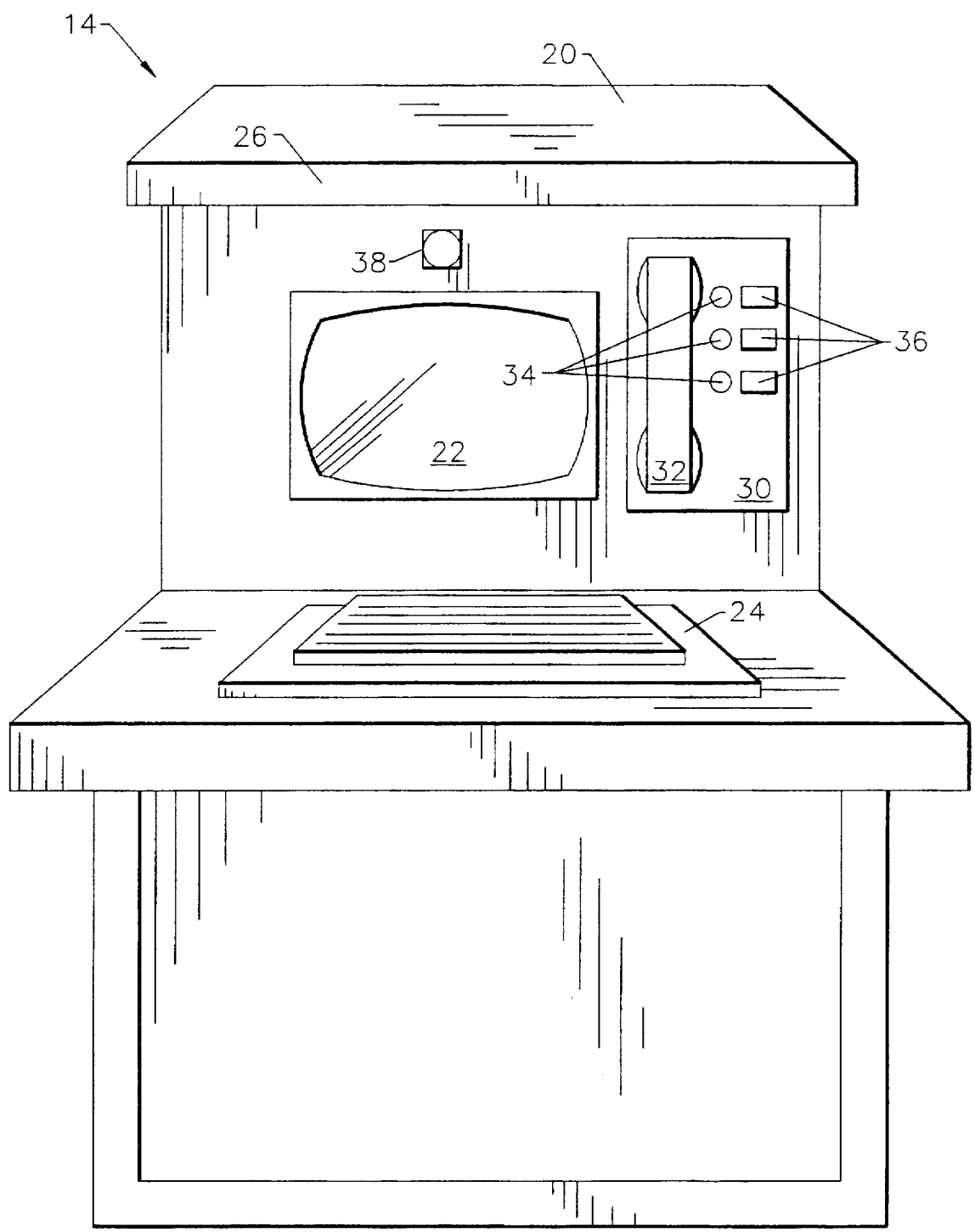
FIG. 2 is a perspective view of a remote terminal of FIG. 1.

Referring now to FIG. 2, a perspective view of a remote terminal 14 is illustrated. Remote terminal 14 includes a housing or booth 20. A display 22, such as a cathode ray tube display, is mounted in the housing 20 for viewing by a user (customer). A printer 24 is also accessible through the housing 20. One or more lights 26 may also be included to illuminate the remote terminal 14.

Housing 20 also includes a face plate 30 mounted thereon. Face plate 30 includes a telephone handset 32 mounted thereon and a plurality of switches 34, preferably in the form of momentary contact push buttons. It will be understood by those having skill in the art that telephone handset 32 includes a telephone microphone and a telephone speaker therein. It will also be understood that the telephone microphone and telephone speaker can be directly mounted on housing 20 for hands-free (speakerphone) operation. Each switch 34 includes an associated identification 36 to identify a telephone number or a type of service which will be accessed upon selection of the associated switch 34. It will be understood by those having skill in the art that switches 34 and telephone number identifications 36 may also be provided on display 22 using well known touch screen technology, wherein the touch screen display includes a plurality of touch screen areas thereon, corresponding to said plurality of telephone numbers. A video camera 38 may also be provided to obtain images of a user of remote terminal 14 and to transmit this image to the host terminal 12 over digital data line 18.

Figure 3:
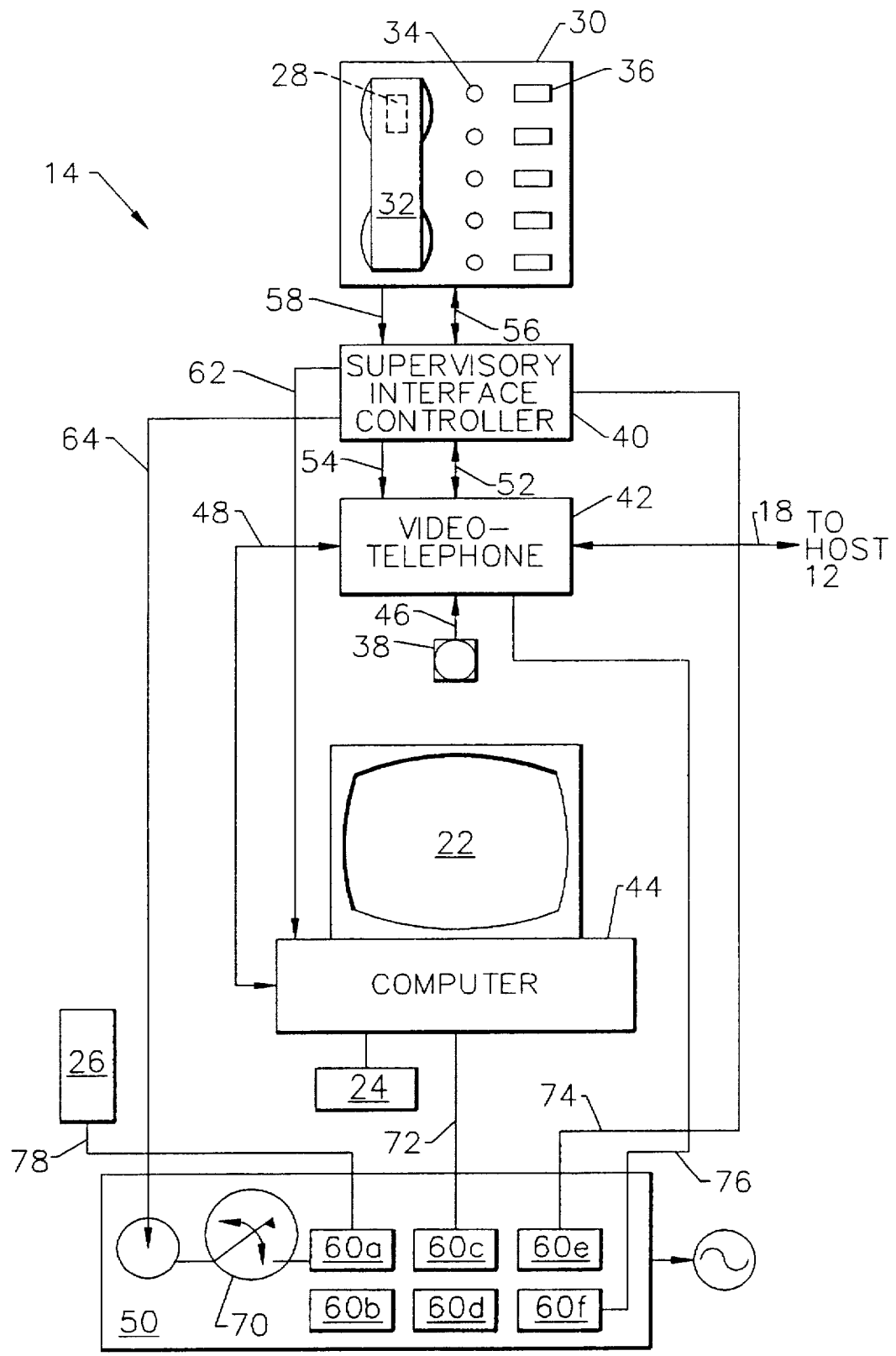
FIG. 3 is a schematic block diagram of the remote terminal of FIG. 2.

FIG. 3 illustrates a schematic block diagram of remote terminal 14. It will be understood by those having skill in the art that the components of FIG. 3 which were not described in connection with FIG. 2 are typically hidden within housing 20 of FIG. 2. As illustrated in FIG. 3, remote terminal 14 includes a communications device such as a videotelephone 42. A model VC7000 Office Based Videoconferencing On Demand System marketed by British Telecom, UK, may be used. This videotelephone is described in manuals entitled *VC7000 Installation Guide* and *VC7000 User Guide,* both undated, the disclosures of which are hereby incorporated herein by reference. Videotelephone 42 includes a digital data line 18 which is connected to host 12 via a telephone network. Videotelephone 42 also includes a coder-decoder (CODEC), not shown, which multiplexes audio, video and data, into a single digital signal. Camera 38 is connected to the video input line 46 of videotelephone 42.

Remote terminal 14 also includes a computer 44 which interfaces with display 22 and which performs the primary data processing function for terminal 14. Computer 44 may be a conventional personal computer. Printer 24 is attached to computer 44. As shown, computer 44 is connected to videotelephone 42 via asynchronous communications port (data line) 48.

Terminal 14 also includes a supervisory interface controller 40 also referred to herein as a controller 40. As described below, the controller 40 may be implemented by a single board computer such as a Model SBC53SX "286" single board computer and an interface board manufactured by WinSystems, Inc., and described in manuals entitled *Operations Manual Motherboards Card Cages*, WinSystems, Inc. 1992, and *Operations Manual* MCM/LPM-SBC53SX, WinSystems, Inc., 1993, the disclosures of which are hereby incorporated herein by reference. However, other microprocessors or personal computers may be used. Controller 40 is connected to videotelephone 42 via audio output line 52 and is also connected to videotelephone 42 via the videotelephone call control line 54. The supervisory interface controller passes audio signals which are received from videotelephone 42 to handset 32 via audio line 56. Controller 40 also receives indications of selection of one of switches 34 or hook switch 28 via line 58. As is well known to those skilled in the art, hook switch 28 indicates that handset 32 has been removed from faceplate 30. Supervisory interface controller 40 also interfaces with computer 44 via a communications port such as an RS-232 parallel or serial communications port 62.

Remote terminal 14 also includes a remotely controlled power strip 50 which is connected to a source of AC power and which includes a plurality of power outlets 60a–60f. As is well known to those having skill in the art, the power strip also includes one or more relays 70, or other means, which remotely switch AC power to and from the power outlets 60a–60f in response to a power control signal applied to power control line 64. It will be understood by those having skill in the art that digital power control signals may be applied to line 64 to selectively energize and deenergize selected power outlets 60a–60f. Alternatively, an energizing current is applied to power line 64 to energize relay 70. When multiple relays are used, power line 64 may include a pair of leads for each relay so that an energizing current may be applied to the appropriate pair of leads to close the associated relay.

As shown in FIG. 3, the power line 72 of computer 44 is connected to power outlet 60c. The power line 74 of supervisory interface controller 40 is connected to power outlet 60e. Outlet 60e is preferably an unswitched outlet which is not controlled by relay 70. The videotelephone 42 is connected to outlet 60f via power line 76, and the power line 78 for lights 26 is connected to outlet 60a. General operation of supervisory interface controller 40 will now be described. Detailed operations will be described in connection with FIGS. 5A–5B below. In general, supervisory interface controller 40 is responsive to selection of one of the switches 34 when the hook switch 28 is activated to identify a telephone number corresponding to the selected switch 34 and to direct the videotelephone 42, via videotelephone call control line 54, to place a telephone call to the identified telephone number on digital data line 18. Thus, the supervisory interface controller 40, in combination with the components on face plate 30 emulates a multiple number autodialer telephone without the need for a separate telephone line for the multiple number autodialer telephone. It will be understood that only a single telephone number may be identified and dialed by supervisory interface controller 40 in response to activation of the hook switch 28, when multiple numbers are not needed.

Supervisory interface controller 40 is also responsive to audio signals which are received on digital data line 18 to identify DTMF (touch) tones which are received over the digital data line 18 along with audio signals. Controller 40 energizes the outlets 60 in the remotely controlled power strip 50 in response to identification of the predetermined DTMF tone sequence to thereby apply power to one or more components of the remote terminal 14. The supervisory interface controller receives the audio signals over audio output line 52 of videotelephone 42. It forwards the audio signals to the handset 32 via audio line 56 but also identifies DTMF sequences which are included in the audio signals.

Selected ones of the power outlets 60a–60f may be energized and deenergized in response to predetermined DTMF sequences via power control line 64. Thus, an operator at host computer 12 can selectively apply power to, and remove power from, components of the remote terminal 14, such as the videotelephone 42, computer 44, lights 26 and/or other components, to thereby activate/deactivate the terminal 14 or reboot a component. Power control line 64 can also be controlled by computer commands sent through digital data line 18 to supervisory interface controller 40.

Figure 4:
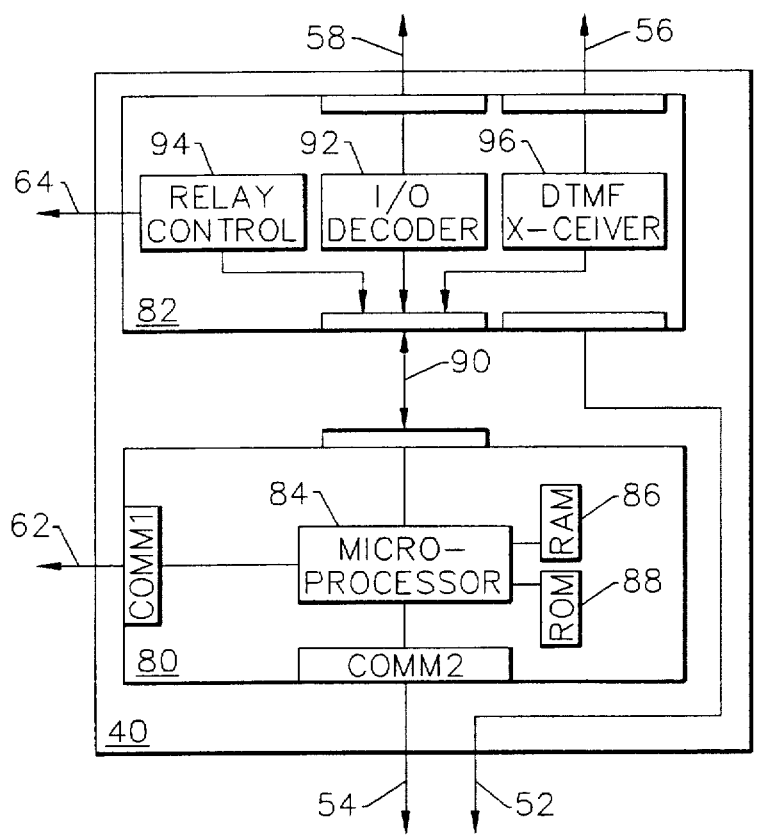
FIG. 4 is a block diagram of the supervisory interface controller of the remote terminal of FIG. 3.

Referring now to FIG. 4, a block diagram of supervisory interface controller 40 is illustrated. Supervisory interface controller 40 may be implemented using a computer board 80 and an interface board 82. Computer board 80 includes a microprocessor 84 such as a 286 type microprocessor and also preferably includes on-board RAM 86 and ROM 88. An interface 90 is provided between computer board 80 and interface board 82. Microprocessor 84 is also connected to PC communications line 62 for example, via its COMM1 port and to videotelephone call control line 54, for example via its COMM2 port.

Interface board 82 includes an I/O decoder 92. I/O decoder may be implemented using a conventional input/output decoder chip such as a 74C922 decoder chip. I/O decoder chip is connected to hook switch 28 and to switches 34 via line 58 and sends a four digit code plus a ready signal to interface 90, upon selection of one of the switches 30 and upon activation of the hook switch 28. Relay control 94 may include one or more relatively low current relays (also referred to as "micro relays"), which are connected to a 74LS14 buffer chip. Upon receiving an appropriate signal via interface 90 the low current relays are energized, to produce a current on an appropriate pair of lines 64 and thereby energize the high current relay or relays 70 (also referred to as "power relays"), in the remotely controlled power strip 50.

Finally, DTMF transceiver (X-CEIVER) 96 identifies DTMF tones which are received over videotelephone audio output line 52 and provides an indication of the decoded DTMF tones to microprocessor 84 via interface 90. The DTMF tones and voice signals are also passed to handset 32 via audio line 56. DTMF transceiver 96 may be implemented using a 75T2091 chip.

Figure 5A:
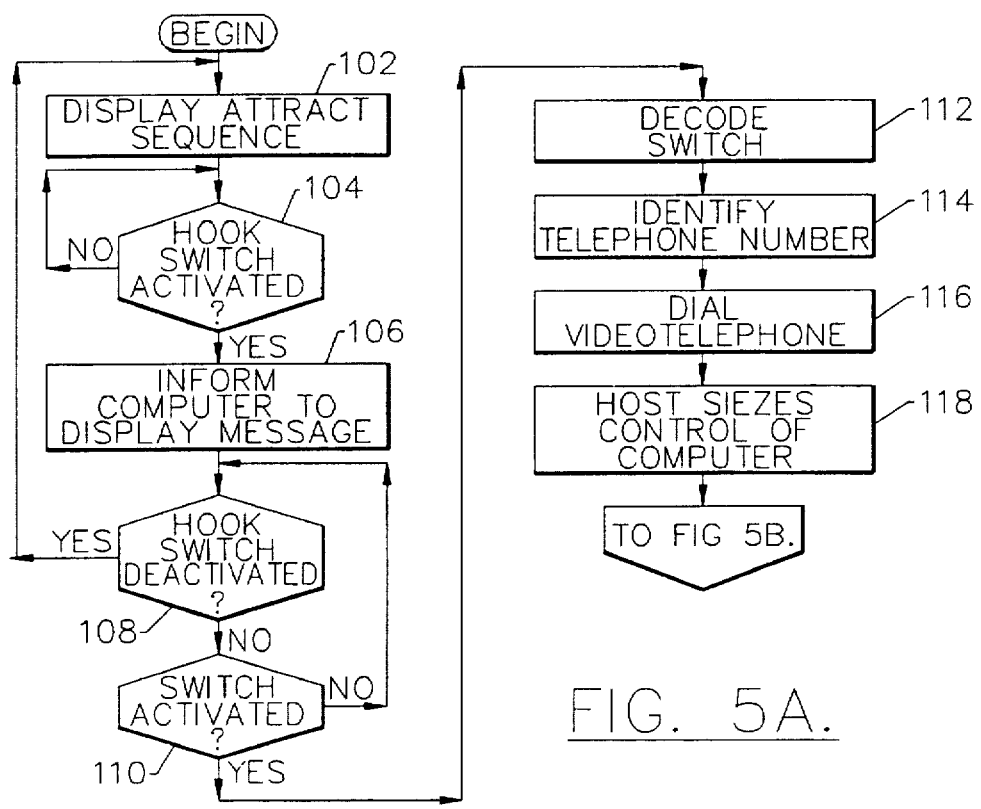
FIGS. 5A and 5B illustrate operations of the supervisory interface controller of FIG. 4.
Figure 5B:
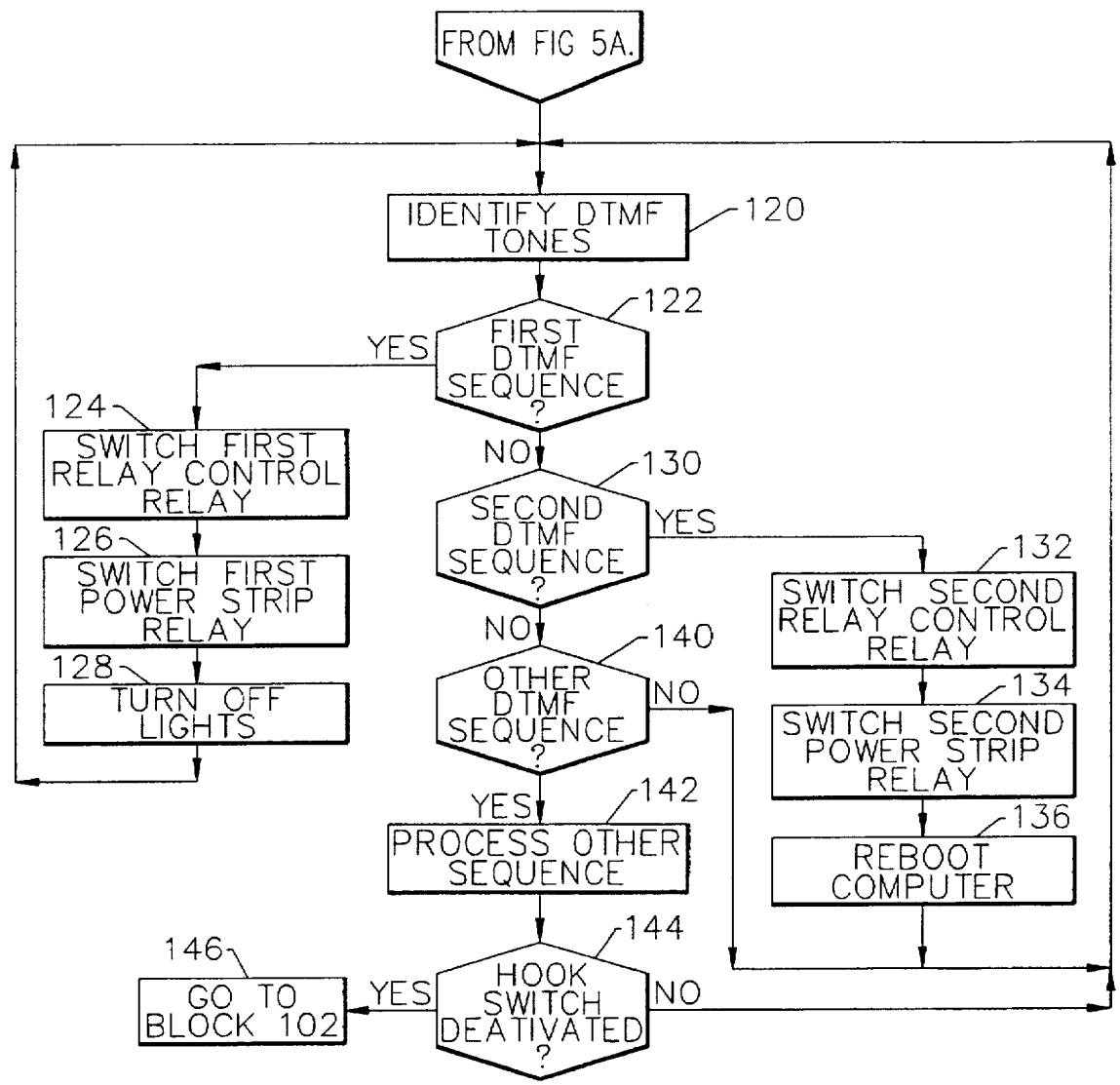

Referring now to FIGS. 5A–5B, operations of supervisory interface controller will now be described. It will be understood by those having skill in the art that these operations are preferably implemented by microprocessor 84 under stored program control. The description of FIGS. 5A and 5B assumes that the remote terminal 14 is up and running. Once running, the display 22 displays an "attract" sequence under the C direction of computer 44, as shown at Block 102. The attract sequence may range from a message such as "Pick up the phone and call the bank!" to a sequence of multimedia images which illustrate the goods or services being offered via remote terminal 14.

The attract sequence continues until the hook switch 28 is activated at Block 104, indicating that a user has lifted the handset 32 from face plate 30. Upon detection of activation of hook switch 28 via line 58, supervisory interface controller 40 indicates to computer 44 to display a message via PC communications line 62, at Block 106. The message may be a simple message to depress an appropriate button or a more complicated message sequence.

If the supervisory interface controller 40 detects that the hook switch has been deactivated, at Block 108, indicating that the handset has been hung up, then computer 44 is instructed to again display the attract sequence (Block 102). If the hook switch has not been deactivated (Block 108) and one of switches 34 has been activated at (Block 110), then the I/O decoder 92 decodes the switch at Block 112, and provides an identification to microprocessor 84 via interface 90.

Microprocessor 84 then identifies the appropriate telephone number at Block 114, and dials the videotelephone at Block 116 via videotelephone call control line 54. The videotelephone 42 then dials the appropriate host terminal 12 via digital data line 18. The host terminal 12 may then seize control of terminal computer 44 to provide personal financial services or other services as described in aforementioned U.S. Pat. No. 5,231,571 to D'Agostino, and as indicated generally at Block 118. The computer 44 displays data stored therein on display 22, in response to receipt of commands over the digital data line 18.

Referring now to FIG. 55, DTMF transceiver 96 identifies DTMF tones in the videotelephone audio output line 52, at Block 120. Multiple DTMF tone sequences may be identified and processed according to the present invention. Two such sequences are illustrated in FIG. 55. As shown at Block 122, upon identification of a first DTMF sequence such as *4, a first relatively low current relay in relay control unit 94 is switched to thereby switch a first high current relay 70 in power strip 50, at Block 126, and thereby turn off lights 26 by switching off outlet 60a of FIG. 3. A second identification of the same DTMF sequence may be used to turn on lines 26. Alternatively, another DTMF sequence can be used to switch on lights 26.

Returning to Block 130, if a second DTMF sequence is identified, such as *8, then at Block 132 a second relay in relay control unit 94 is switched to thereby switch a second relay 70 at power strip 50, at Block 134. This relay may deactivate outlet 60c and cause power to be removed from terminal computer 44 via line 72. A second occurrence of the second DTMF sequence may then be used to reapply power to terminal 44 and thereby reboot terminal computer 44 at Block 136.

Other DTMF sequences may also be detected as indicated generally at Block 140. Upon detection, they are processed appropriately at Block 142. For example, a speakerphone may be turned on or off, printer 24 may be turned on or off, the supervisory interface controller 40 may itself be turned on or off, videotelephone 42 may be turned on or off, and other functions may be accomplished by identifying DTMF tones.

Referring now to Block 144, eventually the hook switch 28 will be deactivated, indicating that the customer has hung up handset 32. Upon deactivation of hook switch 28, processing returns to Block 102 (FIG. 5A). It will be understood by those having skill in the art that special processing may occur if the customer session has been terminated prematurely.

It will also be understood by those having skill in the art that the operations performed in connection with FIGS. 5A and 5B need not occur at the same time as the customer session. Rather, an operator at a host terminal may remotely control remote terminal 14 via supervisory interface controller 40 and DTMF sequences which are transmitted via digital data line 18, at any time.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. A terminal which is remotely controlled over a communications line, said terminal comprising:

a communications device for sending and receiving audio, video and digital data over said communications line;

a computer;

a remotely controlled power strip having a plurality of power outlets and means for remotely switching AC power to and from said power outlets, said computer being connected to at least one of said power outlets;

a plurality of switches each of which corresponds to a telephone number; and a supervisory interface controller, electrically connected to said communications device, said computer, said remotely controlled power strip and said plurality of switches, said supervisory interface controller comprising:

means responsive to selection of one of said switches, for identifying a telephone number corresponding to the selected switch and for directing said communications device to place a telephone call to the identified telephone number on said communications line; and means responsive to said audio which is received over said communications line, for identifying DTMF tones which are received over said communications line, and for energizing said remote switching means in response to identification of a predetermined DTMF tone sequence, to thereby apply power to said computer.

2. A terminal according to claim 1 further comprising a terminal display, connected to said computer, for displaying data from said computer in response to receipt of commands over said communications line.

3. A terminal according to claim 1 wherein said remote AC switching means comprises first means for remotely switching AC power to and from a first one of said power outlets, and second means for remotely switching AC power to and from a second one of said power outlets, said DTMF tone identifying means energizing said first remote AC switching means in response to identification of a first predetermined DTMF tone sequence, and energizing said second remote AC switching means in response to identification of a second predetermined DTMF tone sequence.

4. A terminal according to claim 3 further comprising means for lighting said terminal, said lighting means being connected to said second one of said power outlets, such that said lighting means is remotely energized in response to identification of said second predetermined DTMF tone sequence.

5. A terminal according to claim 1 further comprising a telephone handset and a hook switch for indicating activation of said telephone handset, said hook switch being connected to said supervisory interface controller, said identifying means being responsive to selection of one of said switches and activation of said hook switch, for identifying a telephone number corresponding to the selected switch and for directing said videotelephone to place a telephone call to the identified telephone number on said communications line.

6. A terminal according to claim 1 in combination with a host computer for remotely controlling said terminal over said communications line.

7. A terminal according to claim 1 wherein said remote AC switching means is a relay.

8. A terminal according to claim 1 wherein said communications line is a digital data line.

9. A terminal according to claim 1 wherein said communications device is a videotelephone.

10. A terminal according to claim 1 wherein said communications device includes a coder-decoder (CODEC).

11. A terminal according to claim 1 wherein said plurality of switches comprise a touch screen display having a plurality of touch screen areas thereon.

12. A terminal which is remotely controlled over a digital data line, said terminal comprising:

a videotelephone for sending and receiving audio, video and digital data over said digital data line;

a computer connected to said videotelephone to receive digital data from said digital data line;

a remotely controlled power strip having a plurality of power outlets and at least one relay which remotely switches AC power to and from said power outlets, said computer being connected to at least one of said power outlets;

a telephone handset;

a hook switch for indicating activation of said telephone handset;

a plurality of switches each of which corresponds to a telephone number;

an input/output decoder, which decodes selection of one of said switches, and activation of said hook switch;

means, responsive to said input/output decoder, for identifying a telephone number corresponding to the selected switch and for directing said videotelephone to place a telephone call to the identified telephone number on said digital data line;

a DTMF transceiver, responsive to said audio which is received over said digital data line, for identifying DTMF tones which are received over said digital data line;

means, responsive to said DTMF transceiver, for identifying a predetermined sequence of DTMF tones; and a relay controller, responsive to said DTMF tone sequence identifying means, for energizing said at least one relay in response to identification of said predetermined DTMF tone sequence, to thereby apply power to said computer.

13. A terminal according to claim 12 further comprising a terminal display, connected to said computer, for displaying data from said computer in response to receipt of commands over said digital data line.

14. A terminal according to claim 12:

wherein said remotely controlled power strip includes a first relay which remotely switches AC power to and from a first one of said power outlets, and a second relay which remotely switches AC power to and from a second one of said power outlets; wherein said DTMF tone sequence identifying means comprises means for identifying a first and a second predetermined sequence of DTMF tones; and wherein said relay controller energizes said first relay in response to identification of a first predetermined DTMF tone sequence, and energizes said second relay in response to identification of a second predetermined DTMF tone sequence.

15. A terminal according to claim 14 further comprising means for lighting said terminal, said lighting means being connected to said second one of said power outlets, such that said lighting means is remotely energized in response to identification of said second predetermined DTMF tone sequence.

16. A terminal according to claim 12 in combination with a host computer for remotely controlling said terminal over said digital data line.

17. A method for remotely controlling a terminal over a communications line, the terminal including a computer, a communications device for sending and receiving audio, video and digital data over said communications line, a remotely controlled power strip having a plurality of power outlets and means for remotely switching AC power to and from said power outlets, the computer being connected to at least one of said power outlets, and a plurality of switches each of which corresponds to a telephone number, the method comprising the steps of:

detecting selection of one of the switches;

identifying a telephone number corresponding to the selected switch;

directing the communications device to place a telephone call to the identified telephone number on the communications line;

receiving audio over the communications line;

detecting DTMF tones in the audio which is received over said communications line;

identifying a predetermined DTMF tone sequence in the detected DTMF tones; and energizing the remote switching means in response to identification of the predetermined DTMF tone sequence, to thereby apply power to the computer.

18. A method according to claim 17, wherein the following step is performed after said directing step:

allowing a host computer to seize control of the computer, via the communications line.

19. A method according to claim 18 wherein said allowing step is followed by the step of:

displaying data from the computer in response to receipt of commands from the host computer, via the communications line.

20. A method according to claim 17:

wherein the remote AC switching means comprises first means for remotely switching AC power to and from a first one of the power outlets, and second means for remotely switching AC power to and from a second one of the power outlets;

wherein said DTMF tone identifying step comprises the step of identifying a first and a second predetermined DTMF tone sequence; and wherein said energizing step comprises the step of energizing the first remote AC switching means in response to identification of the first predetermined DTMF tone sequence, and energizing the second remote AC switching means in response to identification of the second predetermined DTMF tone sequence.

21. A method according to claim 20 wherein:

the terminal further includes means for lighting the terminal, the lighting means being connected to the second power outlet; and wherein said energizing step comprises the step of energizing the lighting means in response to identification of said second predetermined DTMF tone sequence.

22. A method according to claim 17:

wherein the terminal further includes a telephone handset and a hook switch for indicating activation of the telephone handset;

wherein said switch selection detecting step comprises the step of detecting selection of one of the switches and activation of the hook switch; and wherein said telephone number identifying step comprises the step of identifying the telephone number in response to selection of one of the switches and activation of the hook switch.

* * * * *